United States Patent
Brzek et al.

(10) Patent No.: US 10,436,048 B2
(45) Date of Patent: Oct. 8, 2019

(54) SYSTEMS FOR REMOVING HEAT FROM TURBINE COMPONENTS

(71) Applicant: General Electric Company, Schenectady, NY (US)

(72) Inventors: Brian Gene Brzek, Clifton Park, NY (US); Victor John Morgan, Simpsonville, SC (US); James Fredric Wiedenhoefer, Clifton Park, NY (US)

(73) Assignee: General Electric Comapny, Schenectady, NY (US)

( * ) Notice: Subject to any disclaimer, the term of this patent is extended or adjusted under 35 U.S.C. 154(b) by 470 days.

(21) Appl. No.: 15/236,083

(22) Filed: Aug. 12, 2016

(65) Prior Publication Data
US 2018/0045058 A1 Feb. 15, 2018

(51) Int. Cl.
F01D 9/06 (2006.01)

(52) U.S. Cl.
CPC ........ F01D 9/065 (2013.01); *F05D 2240/122* (2013.01); *F05D 2250/231* (2013.01); *F05D 2260/2212* (2013.01); *F05D 2260/2214* (2013.01); *Y02T 50/676* (2013.01)

(58) Field of Classification Search
CPC . F01D 5/186; F01D 25/12; F01D 9/02; F01D 9/065; F01D 5/189; F01D 5/188;
(Continued)

(56) References Cited

U.S. PATENT DOCUMENTS

| 3,191,908 A | * | 6/1965 | Petrie | F01D 5/187 416/96 R |
| 3,606,573 A | | 9/1971 | Emmerson et al. | |

(Continued)

FOREIGN PATENT DOCUMENTS

| DE | 2703815 A1 | * | 2/1979 | ............. F01D 5/188 |
| EP | 2489837 A1 | * | 8/2012 | ............. F01D 5/188 |
| EP | 2607624 A1 | | 6/2013 | |

OTHER PUBLICATIONS

Carcassi et al., "Heat Transfer and Pressure Drop Evaluation in Thin Wedge-Shaped Trailing Edge", Heat Transfer, pp. 111-122, 2003.
(Continued)

*Primary Examiner* — J. Todd Newton
(74) *Attorney, Agent, or Firm* — Armstrong Teasdale LLP

(57) ABSTRACT

An airfoil for turbomachines includes a first plurality of projections coupled to a suction sidewall adjacent a trailing edge and extending from the suction sidewall towards a pressure sidewall. A second plurality of projections is coupled to the pressure sidewall adjacent the trailing edge and extending from the pressure sidewall towards the suction sidewall. The airfoil includes a divider coupled to the first and second pluralities of projections and extending within a space between the first and second pluralities of projections. A first cooling channel is defined adjacent the suction sidewall and a second cooling channel is defined adjacent the pressure sidewall. The first and second cooling channels are configured to receive a coolant stream. The first plurality of projections is configured to meter the coolant stream through the first cooling channel and the second plurality of projections is configured to meter the coolant stream through the second cooling channel.

19 Claims, 4 Drawing Sheets

(58) Field of Classification Search
CPC ............. F05D 2220/32; F05D 2240/35; F05D 2220/3212; F05D 2260/202; F05D 2240/304; F05D 2240/122; F05D 2260/201; F02C 3/04; Y02T 50/676
USPC ............. 415/115, 116; 416/96 A, 96 R, 97 R
See application file for complete search history.

(56) References Cited

U.S. PATENT DOCUMENTS

| | | | | |
|---|---|---|---|---|
| 3,806,276 | A * | 4/1974 | Aspinwall | F01D 5/189 415/115 |
| 4,056,332 | A * | 11/1977 | Meloni | F01D 5/188 415/115 |
| 4,063,851 | A | 12/1977 | Weldon | |
| 4,297,077 | A * | 10/1981 | Durgin | F01D 5/189 416/97 R |
| 4,403,917 | A * | 9/1983 | Laffitte | F01D 5/188 415/115 |
| 4,407,632 | A * | 10/1983 | Liang | F01D 5/187 415/115 |
| 4,515,523 | A * | 5/1985 | North | F01D 5/187 415/115 |
| 4,697,985 | A * | 10/1987 | Suzuki | F01D 5/189 415/115 |
| 5,100,293 | A * | 3/1992 | Anzai | F01D 5/186 416/96 A |
| 5,193,980 | A | 3/1993 | Kaincz et al. | |
| 5,328,331 | A * | 7/1994 | Bunker | F01D 5/187 415/115 |
| 5,591,002 | A | 1/1997 | Cunha et al. | |
| 5,626,462 | A * | 5/1997 | Jackson | C22C 32/00 416/229 A |
| 5,702,232 | A * | 12/1997 | Moore | F01D 5/186 416/95 |
| 5,743,708 | A | 4/1998 | Cunha et al. | |
| 5,820,337 | A * | 10/1998 | Jackson | C22C 32/00 415/200 |
| 6,000,908 | A | 12/1999 | Bunker | |
| 6,206,638 | B1 | 3/2001 | Glynn et al. | |
| 6,238,183 | B1 * | 5/2001 | Williamson | F01D 5/189 416/96 A |
| 6,318,963 | B1 * | 11/2001 | Emery | F01D 5/186 416/96 A |
| 6,506,013 | B1 | 1/2003 | Burdgick et al. | |
| 6,530,745 | B2 * | 3/2003 | Ciani | F01D 5/186 415/115 |
| 6,582,194 | B1 * | 6/2003 | Birkner | B23P 15/04 415/115 |
| 6,726,444 | B2 | 4/2004 | Zhao et al. | |
| 6,974,308 | B2 | 12/2005 | Halfmann et al. | |
| 7,125,225 | B2 * | 10/2006 | Surace | F01D 5/16 416/96 R |
| RE39,479 | E * | 1/2007 | Tressler | F01D 5/189 415/115 |
| 7,497,655 | B1 * | 3/2009 | Liang | F01D 5/189 415/1 |
| 7,556,476 | B1 * | 7/2009 | Liang | F01D 5/188 415/115 |
| 7,568,882 | B2 | 8/2009 | Brittingham et al. | |
| 7,625,180 | B1 * | 12/2009 | Liang | F01D 5/186 29/889.2 |
| 7,690,894 | B1 | 4/2010 | Liang | |
| 7,819,169 | B2 | 10/2010 | Pietraszkiewicz et al. | |
| 7,866,948 | B1 * | 1/2011 | Liang | F01D 5/186 416/97 R |
| 7,871,246 | B2 | 1/2011 | Liang | |
| 7,938,624 | B2 * | 5/2011 | Tibbott | F01D 5/187 415/115 |
| 8,043,057 | B1 | 10/2011 | Liang | |
| 8,043,060 | B1 | 10/2011 | Liang | |
| 8,057,183 | B1 * | 11/2011 | Liang | F01D 5/187 416/96 A |
| 8,096,770 | B2 * | 1/2012 | Liang | F01D 5/186 415/115 |
| 8,162,609 | B1 | 4/2012 | Liang | |
| 8,182,203 | B2 | 5/2012 | Hada et al. | |
| 8,231,329 | B2 * | 7/2012 | Benjamin | F01D 5/188 415/115 |
| 8,267,659 | B2 * | 9/2012 | Ahmad | F01D 5/181 29/889.721 |
| 8,403,626 | B2 * | 3/2013 | Hasselqvist | F01D 5/143 415/91 |
| 8,562,295 | B1 | 10/2013 | Liang | |
| 9,011,077 | B2 * | 4/2015 | Vitt | F01D 5/186 415/115 |
| 9,011,079 | B2 | 4/2015 | Coign et al. | |
| 9,169,733 | B2 | 10/2015 | Kerber et al. | |
| 9,267,381 | B2 | 2/2016 | Morris et al. | |
| 9,297,261 | B2 | 3/2016 | Otero | |
| 9,863,255 | B2 * | 1/2018 | Mugglestone | F01D 5/189 |
| 2004/0009066 | A1 * | 1/2004 | Soechting | F01D 5/186 416/96 R |
| 2005/0135935 | A1 * | 6/2005 | Gregg | F01D 5/16 416/135 |
| 2005/0169754 | A1 * | 8/2005 | Surace | F01D 5/16 416/97 R |
| 2005/0232769 | A1 | 10/2005 | Lee et al. | |
| 2007/0243065 | A1 * | 10/2007 | Devore | F01D 5/189 416/97 R |
| 2007/0258814 | A1 | 11/2007 | Metrisin et al. | |
| 2008/0063524 | A1 * | 3/2008 | Tibbott | F01D 5/187 416/95 |
| 2010/0221121 | A1 * | 9/2010 | Liang | F01D 5/187 416/97 R |
| 2010/0247290 | A1 * | 9/2010 | Hada | F01D 5/189 415/115 |
| 2012/0183412 | A1 * | 7/2012 | Lacy | F01D 5/186 416/97 R |
| 2013/0232991 | A1 * | 9/2013 | Otero | F01D 5/187 60/806 |
| 2014/0064930 | A1 * | 3/2014 | NguyenLoc | F01D 15/12 415/122.1 |
| 2014/0093379 | A1 * | 4/2014 | Tibbott | F01D 5/189 416/224 |
| 2014/0093390 | A1 * | 4/2014 | Pointon | F01D 5/186 416/97 R |
| 2014/0147287 | A1 * | 5/2014 | Xu | F01D 5/186 416/96 R |
| 2014/0219788 | A1 | 8/2014 | Nilsson | |
| 2015/0096305 | A1 * | 4/2015 | Morgan | F01D 5/18 60/805 |
| 2015/0147158 | A1 | 5/2015 | Wang et al. | |
| 2015/0345397 | A1 * | 12/2015 | Bunker | F02C 7/18 416/95 |
| 2017/0030199 | A1 * | 2/2017 | Barker | F01D 5/189 |
| 2017/0101932 | A1 * | 4/2017 | Stover | F01D 5/189 |
| 2017/0175578 | A1 * | 6/2017 | Propheter-Hinckley | F01D 9/02 |
| 2018/0045055 | A1 * | 2/2018 | Brzek | F01D 9/02 |
| 2018/0045056 | A1 * | 2/2018 | Wiedenhoefer | F01D 5/186 |
| 2018/0045058 | A1 * | 2/2018 | Brzek | F01D 9/065 |
| 2018/0283184 | A1 * | 10/2018 | Marsh | F01D 5/187 |

OTHER PUBLICATIONS

Bunker et al., "In-Wall Network (Mesh) Cooling Augmentation of Gas Turbine Airfoils", Heat Transfer, pp. 1007-1018, 2004.
Robert F Bergholz, "Preliminary Design Optimization of Impingement Cooled Turbine Airfoils", Heat Transfer, vol. 4, pp. 675-689, Jun. 9-13, 2008.
Terzis et al., "Detailed Heat Transfer Distributions of Narrow Impingement Channels for Cast-In Turbine Airfoils", Journal of Turbomachinery, vol. 136, Issue: 9, pp. 9, Jun. 3, 2014.

* cited by examiner

SYSTEMS FOR REMOVING HEAT FROM TURBINE COMPONENTS

BACKGROUND

The field of the disclosure relates generally to turbomachinery and, more specifically, to systems for removing heat from turbine components.

In at least some known gas turbine engines, air is pressurized in a compressor and mixed with fuel in a combustor for generating a stream of high-temperature combustion gases. Energy is extracted from the gas stream in a turbine which powers a mechanical load. During operation of the gas turbine engine, various hot gas path components are subjected to the high-temperature gas stream, which can induce wear in the hot gas path components. Generally, higher temperature gases increase performance, efficiency, and power output of the gas turbine engine. Thus, at least some known hot gas path components are cooled to facilitate the gas turbine engine to operate with the increased high-temperature combustion gas streams.

Some known hot gas path components include an airfoil with a cooling system, such that air, typically bleed air extracted from the compressor, is forced through internal cooling passages defined within the airfoil. The air is then discharged through cooling holes or passages located at an outer surface of the airfoil to transfer heat away from the hot gas path component. This forced air cooling facilitates the hot gas path components functioning in the high-temperature gas stream. At least some known cooling systems increase a sidewall thickness of the airfoil at a trailing edge to increase cooling air flow velocity through the trailing edge to facilitate heat transfer therefrom. However, increasing the sidewall thickness of the airfoil also increases thermal resistance of the surfaces to be cooled at the trailing edge. At least some other known cooling systems increase the cooling air flow velocity by extracting additional bleed air from the compressor. However, extracting additional bleed air reduces gas turbine engine efficiency.

BRIEF DESCRIPTION

In one aspect, an airfoil for a turbomachine is provided. The airfoil includes a pressure sidewall and a suction sidewall coupled to the pressure sidewall. The suction sidewall and the pressure sidewall define a leading edge and a trailing edge opposite the leading edge. A first plurality of projections is coupled to the suction sidewall adjacent the trailing edge and extending from the suction sidewall towards the pressure sidewall. A second plurality of projections is coupled to the pressure sidewall adjacent the trailing edge and extending from the pressure sidewall towards the suction sidewall. The airfoil further includes a divider coupled to the first plurality of projections and the second plurality of projections and extending within a space defined between the first plurality of projections and the second plurality of projections, such that a first cooling channel is defined adjacent the suction sidewall and a second cooling channel is defined adjacent the pressure sidewall. The first cooling channel and the second cooling channel are configured to receive at least one coolant stream. The first plurality of projections is configured to meter the at least one coolant stream through the first cooling channel and the second plurality of projections is configured to meter the at least one coolant stream through the second cooling channel.

In another aspect, a system for removing heat from an airfoil is provided. The airfoil includes a pressure sidewall and a suction sidewall coupled to the pressure sidewall. The suction sidewall and the pressure sidewall define a leading edge and a trailing edge opposite the leading edge. The system includes a first plurality of projections coupled to the suction sidewall adjacent the trailing edge and extending from the suction sidewall towards the pressure sidewall. A second plurality of projections is coupled to the pressure sidewall adjacent the trailing edge and extending from the pressure sidewall towards the suction sidewall. The system further includes a divider coupled to the first plurality of projections and the second plurality of projections and extending within a space defined between the first plurality of projections and the second plurality of projections, such that a first cooling channel is defined adjacent the suction sidewall and a second cooling channel is defined adjacent the pressure sidewall. The first cooling channel and the second cooling channel configured to receive at least one coolant stream. The first plurality of projections is configured to meter the at least one coolant stream through the first cooling channel and the second plurality of projections is configured to meter the at least one coolant stream through the second cooling channel.

In still another aspect, a turbomachine is provided. The turbomachine includes a compressor, a turbine rotatably coupled to the compressor, and a combustor coupled in flow communication with the compressor and the turbine. The turbomachine further includes at least one airfoil coupled to the turbine. The at least one airfoil includes a pressure sidewall and a suction sidewall coupled to the pressure sidewall. The suction sidewall and the pressure sidewall define a leading edge and a trailing edge opposite the leading edge. A first plurality of projections is coupled to the suction sidewall adjacent the trailing edge and extending from the suction sidewall towards the pressure sidewall. A second plurality of projections is coupled to the pressure sidewall adjacent the trailing edge and extending from the pressure sidewall towards the suction sidewall. The airfoil further includes a divider coupled to the first plurality of projections and the second plurality of projections and extending within a space defined between the first plurality of projections and the second plurality of projections, such that a first cooling channel is defined adjacent the suction sidewall and a second cooling channel is defined adjacent the pressure sidewall. The first cooling channel and the second cooling channel are configured to receive at least one coolant stream. The first plurality of projections is configured to meter the at least one coolant stream through the first cooling channel and the second plurality of projections is configured to meter the at least one coolant stream through the second cooling channel.

DRAWINGS

These and other features, aspects, and advantages of the present disclosure will become better understood when the following detailed description is read with reference to the accompanying drawings in which like characters represent like parts throughout the drawings, wherein.

Figure 1:
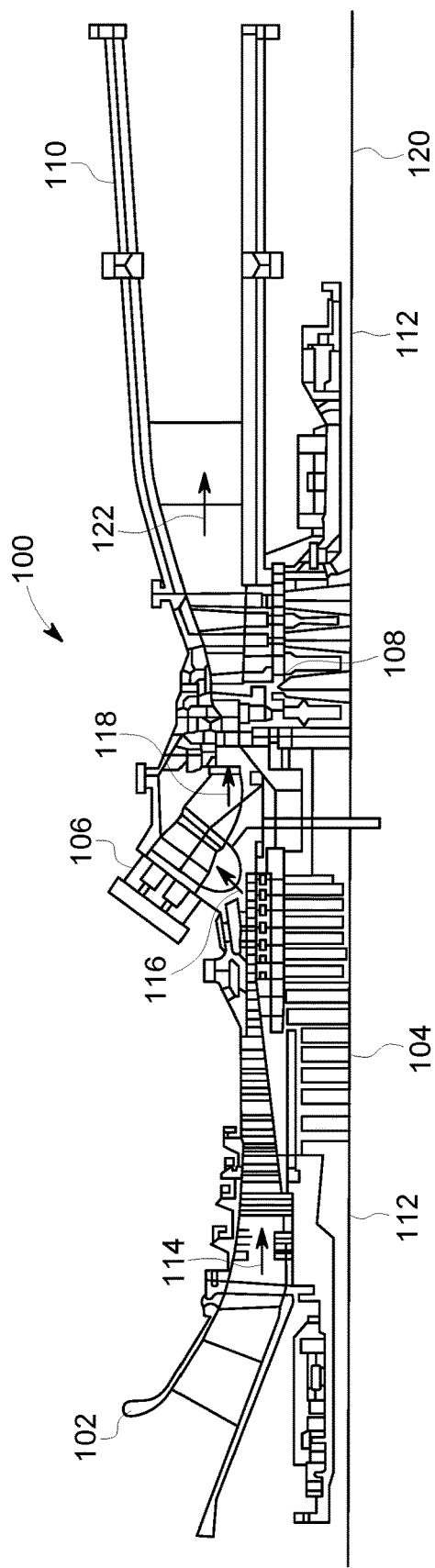
FIG. 1 is a schematic view if an exemplary rotor machine, i.e., a gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about a longitudinal axis of the gas turbine engine.

Embodiments of the present disclosure relate to systems that remove heat and provide cooling for gas turbine components. Specifically, in the exemplary embodiment, the gas turbine component includes an airfoil that includes a cooling system defined within a trailing edge. The trailing edge includes two cooling channels, a pressure sidewall cooling channel, and a suction sidewall cooling channel, separated by a divider and each cooling channel defined by a pin bank. The pressure sidewall cooling channel is defined by a pin bank spanning between a pressure sidewall of the airfoil and the divider, while the suction sidewall cooling channel is defined by a pin bank spanning between a suction sidewall of the airfoil and the divider. The divider and the pin banks within the airfoil facilitate controlling metering and a velocity of a coolant stream that is channeled through the pressure sidewall cooling channel and the suction sidewall cooling channel to remove heat from the trailing edge and maintain a consistent and uniform temperature of the airfoil. By metering the coolant stream velocity, the Reynolds number is increased and pressure drop across the cooling channel is increased, thus facilitating an increase of a heat removal rate from the trailing edge.

In some embodiments, the cooling system at the trailing edge also includes a third downstream cooling channel, i.e., an aft cooling channel, which receives the coolant stream from the pressure sidewall cooling channel and the suctions sidewall cooling channel. The aft cooling channel is defined by a pin bank spanning between the pressure sidewall and the suction sidewall that taper towards one another. This pin bank includes a plurality of support projections that progressively decrease in size and increase in spacing therebetween from an upstream direction to a downstream direction. The aft cooling channel also facilitates controlling metering and the velocity of the coolant stream that is channeled therethrough. The embodiments described herein provide a trailing edge cooling system that decreases bleed air extracted from a compressor for the coolant stream channeled through the cooling system, while increasing the coolant stream efficiency within a component region that is traditionally difficult to cool. Gas turbine engine efficiency is also increased because less bleed air is extracted for use as the coolant stream and combustion temperatures are increased.

FIG. 1 is a schematic view of a rotary machine 100, i.e., a turbomachine, and more specifically, a turbine engine. In the exemplary embodiment, turbine engine 100 is a gas turbine engine. Alternatively, turbine engine 100 is any other turbine engine and/or rotary machine, including, and without limitation, a steam turbine engine, an aircraft engine, a wind turbine, and a compressor. In the exemplary embodiment, gas turbine engine 100 includes an air intake section 102, and a compressor section 104 that is coupled downstream from, and in flow communication with, intake section 102. A combustor section 106 is coupled downstream from, and in flow communication with, compressor section 104, and a turbine section 108 is coupled downstream from, and in flow communication with combustion section 106. Downstream from turbine section 108 is an exhaust section 110. Moreover, in the exemplary embodiment, turbine section 108 is rotatably coupled to compressor section 104 through a rotor assembly 112.

In operation, air intake section 102 channels air 114 towards compressor section 104. Compressor section 104 compresses inlet air 114 to higher pressures prior to discharging compressed air 116 towards combustor section 106. Compressed air 116 is channeled to combustor section 106 where it is mixed with fuel (not shown) and burned to generate high temperature combustion gases 118. Combustion gases 118 are channeled downstream towards turbine section 108, such that after impinging turbine blades (not shown) thermal energy is converted to mechanical rotational energy that is used to drive rotor assembly 112 about a longitudinal axis 120. Often, combustor section 106 and turbine section 108 are referred to as a hot gas section of turbine engine 100. Exhaust gases 122 then discharge through exhaust section 110 to ambient atmosphere.

Figure 2:
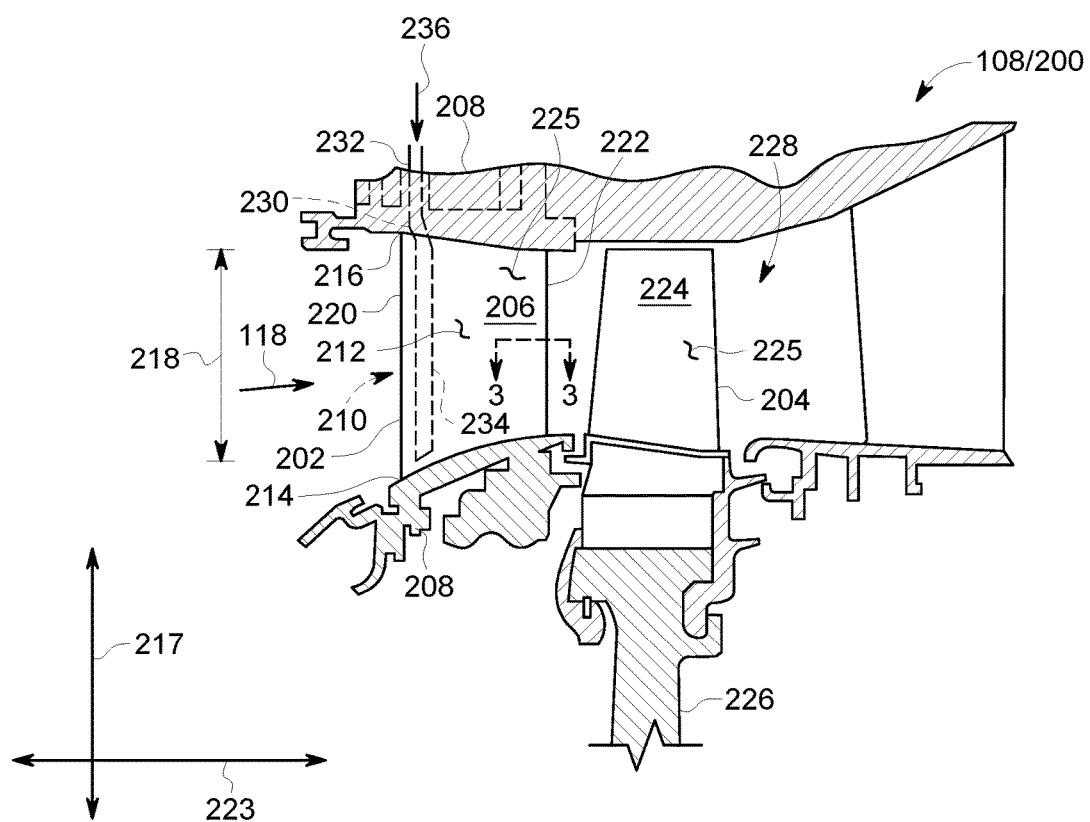
FIG. 2 is an enlarged schematic view of an exemplary first turbine stage of the gas turbine engine shown in FIG. 1.

FIG. 2 is an enlarged schematic view of a first turbine stage 200 of turbine engine 100 (shown in FIG. 1). In the exemplary embodiment, turbine section 108 includes a plurality of stator vanes 202 circumferentially spaced around longitudinal axis 120 (shown in FIG. 1) and a plurality of turbine blades 204 also circumferentially spaced around longitudinal axis 120. A row of stator vanes 202 and a row of turbine blades 204 form a turbine stage, for example first turbine stage 200, that is the first turbine stage downstream of combustor section 106 (shown in FIG. 1). Although a single turbine stage 200 is shown in FIG. 2, turbine section 108 may include any number of axially spaced turbine stages.

In the exemplary embodiment, stator vane 202 includes an airfoil 206 that is coupled to a turbine casing 208. Airfoil 206 includes a pressure sidewall 210 coupled to an opposite suction sidewall 212. Pressure sidewall 210 and suction sidewall 212 extend from a root 214 to an opposite tip 216 that defines a radial direction 217 such that airfoil 206 has a radial length 218 which extends in radial direction 217. Pressure sidewall 210 and suction sidewall 212 also define a leading edge 220 and an opposing trailing edge 222. Leading edge 220 and trailing edge 222 define a longitudinal direction 223. Additionally, turbine blade 204 includes an airfoil 224 coupled to rotor assembly 112 through a disk 226. Each airfoil 206 and 224 is coated with a layer 225 of a thermal bond coating (TBC). TBC layer 225 is formed on each airfoil 206 and 224 for increased protection against high temperature combustion gases 118.

During turbine engine 100 operation, stator vane 202 and turbine blade 204 are positioned within a hot gas flow path 228 of turbine casing 208, such that a flow of high temperature combustion gases 118 is channeled therethrough, exposing outer surfaces of stator vane airfoil 206 and turbine blade airfoil 224 to high temperatures and potential corresponding thermal stresses and/or thermal degradation. To at least partially address such thermal exposure, stator vane airfoil 206 and/or any other hot gas section component includes a cooling system 230. Cooling system 230 includes a cooling supply passage 232, defined in turbine casing 208, coupled in fluid communication with at least one cooling passage 234 defined within stator vane airfoil 206. A stream of coolant fluid 236 is channeled through cooling system 230 through a coolant stream source (not shown) to facilitate removing heat from airfoil 206 and maintaining a consistent and uniform temperature gradient of airfoil 206 to increase component efficiency. In the exemplary embodiment, coolant fluid 236 includes pressurized bleed air from compressor section 104 (shown in FIG. 1). Although air is specifically described, in alternative embodiments a fluid other than air may be used to cool components exposed to combustion gases 118. The term fluid as used herein includes any medium or material that flows, including, but not limited to, gas, steam, and air.

Figure 3:
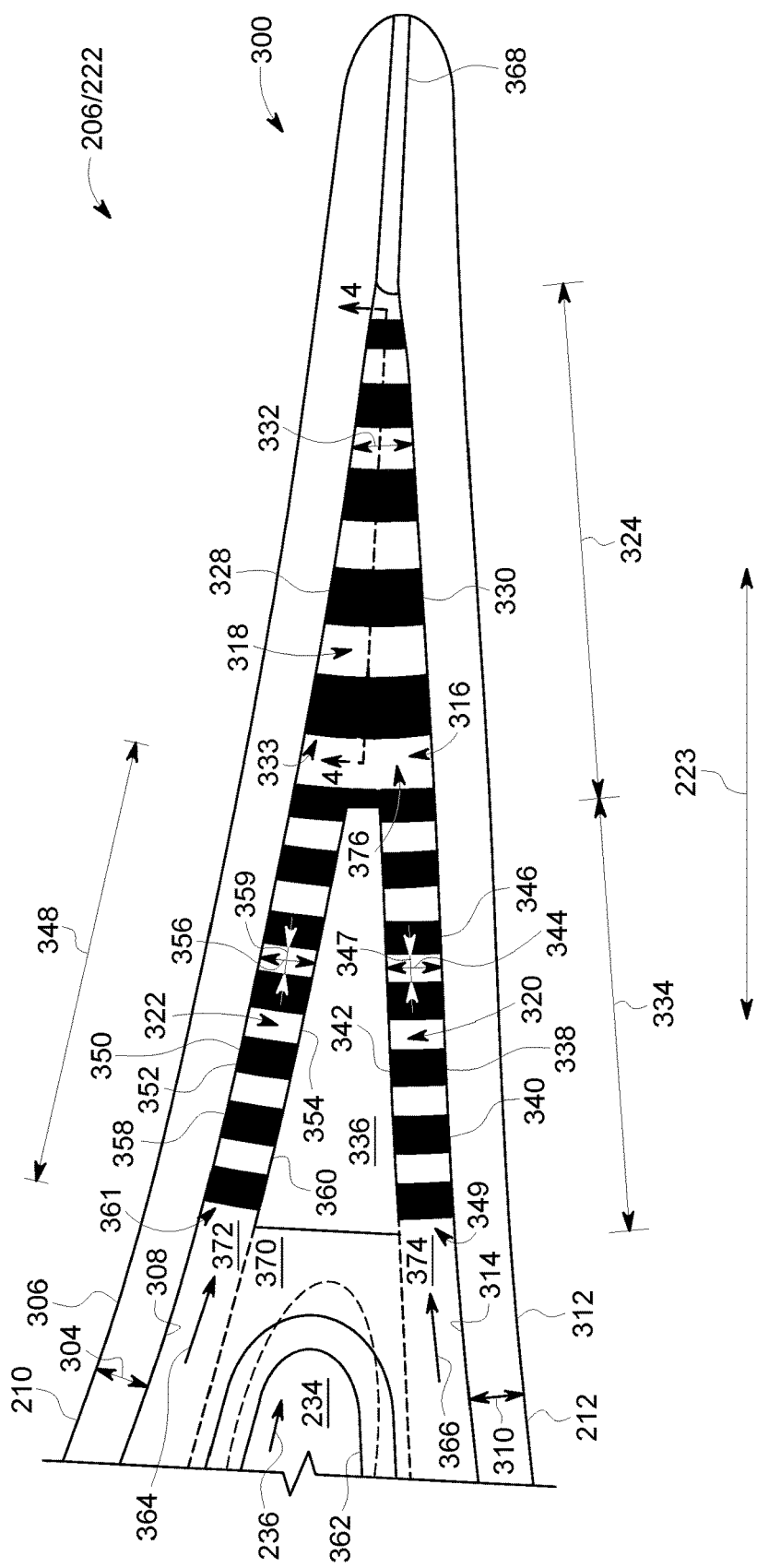
FIG. 3 is a cross-sectional view of an exemplary trailing edge shown in FIG. 2 taken along line 3-3.

FIG. 3 is a cross-sectional view of an exemplary trailing edge 222 taken along line 3-3 as shown in FIG. 2. In the exemplary embodiment, stator vane airfoil 206 includes pressure sidewall 210 coupled to suction sidewall 212 at trailing edge 222. Pressure sidewall 210 and suction sidewall 212 progressively taper towards each other to form a trailing edge tip section 300 such that each sidewall 210 and 212 is coupled to each other. Pressure sidewall 210 includes a substantially uniform thickness 304 with an outer surface 306 that is exposed to combustion gases 118 (shown in FIGS. 1 and 2) and an opposite inner surface 308. Similarly, suction sidewall 212 includes a substantially uniform thickness 310 with an outer surface 312 that is exposed to combustion gases 118 and an opposite inner surface 314.

Trailing edge 222 further includes a trailing edge cooling system 316. Trailing edge cooling system is included within the overall airfoil cooling system 230 described and referenced in FIG. 2. Trailing edge cooling system 316 includes three cooling channels, an aft cooling channel 318, a suction sidewall cooling channel 320, and a pressure sidewall cooling channel 322. Aft cooling channel 318 extends a first distance 324 along longitudinal direction 223 from trailing edge tip section 300 towards leading edge 220 (shown in FIG. 2) and positioned between pressure sidewall 210 and suction sidewall 212. Aft cooling channel 318 includes an aft pin bank 328. Aft pin bank 328 includes a plurality of support projections 330, also referenced as pins, which extend between pressure sidewall inner surface 308 and suction sidewall inner surface 314. In the exemplary embodiment, each support projection 330 is substantially cylindrical in shape and multiple support projections 330 are positioned throughout aft cooling channel 318 extending along first distance 324 and extending along airfoil length 218 (shown in FIG. 2). In alternative embodiments, each support projection 330 has any other dimensional profile, for example size and/or shape, that enables aft cooling channel 318 to function as described herein.

In the exemplary embodiment, pressure sidewall inner surface 308 and suction sidewall inner surface 314 taper towards each other and thus are not parallel to one another. As such, the plurality of support projections 330 generally decrease in a length 332 and size, while increasing in spacing, as each support projection 330 is located closer to trailing edge tip section 300. With support projections 330 decreasing in size and increasing in spacing, aft cooling channel 318 has a consistent cross-sectional flow area 333 throughout channel 318 even with the tapering sidewalls 210 and 212. Sizing and spacing of support projections 330 will be discussed further below in reference to FIG. 4.

Suction sidewall cooling channel 320 extends a second distance 334 along longitudinal distance 223 from aft cooling channel 318 towards leading edge 220. Suction sidewall cooling channel 320 is positioned between suction sidewall 212 and a divider 336 that is located between suction sidewall 212 and pressure sidewall 210. Suction sidewall cooling channel 320 includes a suction sidewall pin bank 338. Suction sidewall pin bank 338 includes a plurality of support projections 340, also referenced as pins, which extend between suction sidewall inner surface 314 and a first surface 342 of divider 336. In the exemplary embodiment, each support projection 340 is substantially cylindrical in shape and multiple support projections 340 are positioned throughout suction sidewall cooling channel 320 extending along second distance 334 and extending along airfoil length 218. In alternative embodiments, each support projection 340 has any other shape that enables suction sidewall cooling channel 320 to function as described herein.

In the exemplary embodiment, suction sidewall inner surface 314 and divider surface 342 are substantially parallel to one another. As such, each support projection 340 generally has a similar length 344. Additionally, each support projection 340 generally has a similar size and spacing. Support projections 340 are arranged in a plurality of columns 346 extending and equidistantly spaced 347 along second distance 334, such that each column 346 includes a plurality of rows (not shown) extending along radial length 218. Each support projection 340 is sized approximately equal to each other 340 and equidistantly spaced 347. With support projections 340 having consistent sizing and spacing, suction sidewall cooling channel 320 has a consistent cross-sectional flow area 349 throughout channel 320. In alternative embodiments, suction sidewall cooling channel 320 and suction sidewall pin bank 338 may be sized and shaped in any other way to enable trailing edge cooling system 316 to function as described herein.

Pressure sidewall cooling channel 322 extends a third distance 348 along longitudinal distance 223 from aft cooling channel 318 towards leading edge 220. Pressure sidewall cooling channel 322 is positioned between pressure sidewall 210 and divider 336. Pressure sidewall cooling channel 322 includes a pressure sidewall pin bank 350. Pressure sidewall pin bank 350 includes a plurality of support projections 352, also referenced as pins, which extend between pressure sidewall inner surface 308 and a second surface 354 of divider 336. In the exemplary embodiment, each support projection 352 is substantially cylindrical in shape and multiple support projections 352 are positioned throughout pressure sidewall cooling channel 322 extending along third distance 348 and extending along airfoil length 218. In alternative embodiments, each support projection 352 has any other shape that enables pressure sidewall cooling channel 322 to function as described herein.

In the exemplary embodiment, pressure sidewall inner surface 308 and divider surface 354 are substantially parallel to one another. As such, each support projection 352 generally has a similar length 356. Additionally, each support projection 352 generally has a similar size and spacing. Support projections 352 are arranged in a plurality of columns 358 extending and equidistantly spaced 359 along third distance 348, such that each column 358 includes a plurality of rows (not shown) extending along radial length 218. Each support projection 352 is sized approximately equal to each other 352 and equidistantly spaced 359. With support projections 352 having consistent size and spacing, pressure sidewall cooling channel 322 has a consistent cross-sectional flow area 361 throughout channel 322. In alternative embodiments, pressure sidewall cooling channel 322 and pressure sidewall pin bank 350 may be sized and shaped in any other way to enable trailing edge cooling system 316 to function as described herein.

Airfoil 206, including sidewalls 210 and 212 and trailing edge 222, is fabricated through a casting process. For example, a ceramic core (not shown) is formed in the shape of trailing edge cooling system 316 such that a substrate of airfoil 206 may be casted around the ceramic core. The ceramic core is then removed leaving airfoil 206 with trailing edge cooling system 316 formed therein. In the exemplary embodiment, divider 336 is formed as part of this casting process. However, in alternative embodiments, divider 336 may be formed separately and not part of the casting process. In this alternative embodiment, divider 336 is coupled to airfoil 206, and between suction sidewall pin bank 338 and pressure sidewall pin bank 350, after airfoil 206 is cast, such that divider 336 is brazed 360 to each pin bank 338 and 350. Alternatively, insert divider 336 may be press fit or coupled to airfoil 206 through any other suitable method. Additionally or alternatively, airfoil 206 may be fabricated using any other suitable fabrication method that enables trailing edge cooling system 316 to function as described herein, for example by additive manufacturing or by post cast machining.

In the exemplary embodiment, trailing edge cooling system 316 is shown within airfoil 206 of stator vane 202, however, in alternative embodiments, trailing edge cooling system is within a trailing edge that is included within blade airfoil 224 (shown in FIG. 2) and/or any other turbine engine component that includes an airfoil therein.

During turbine engine 100 (shown in FIG. 1) operation, airfoil 206 is exposed to high temperatures combustion gases 118 (shown in FIGS. 1 and 2). To reduce corresponding thermal stresses and/or thermal degradation of airfoil 206, coolant fluid 236 is channeled through at least one cooling passage 234 defined within airfoil 206 to provide a coolant stream therein. For example, coolant fluid 236 is channeled through cooling passage 234, cooling passage 234 includes a hollow insert 362 that includes apertures (not shown) therein. Coolant fluid 236 is directed into insert 362 and is exhausted through the apertures to form jets of air striking inner surfaces 308 and 314 of airfoil 206 for impingement cooling, removing heat, and reducing the temperature of each sidewall 210 and 212 which are in contact with combustion gases 118. Coolant fluid 236 is further channeled and/or directed from the impingement cooling zone to trailing edge cooling system 316 that is in flow communication with cooling supply passage 232 to facilitate cooling trailing edge 222 of airfoil 206.

In the exemplary embodiment, a portion 364 of coolant fluid 236 is channeled through pressure sidewall cooling channel 322 to facilitate cooling pressure sidewall 210 along third distance 348. Similarly, a portion 366 of coolant fluid 236 is channeled through suction sidewall cooling channel 320 to facilitate cooling suction sidewall 212 along second distance 334. By positioning divider 336 between pressure sidewall cooling channel 322 and suction sidewall cooling channel 320, each flow area 349 and 361 of suction sidewall cooling channel 320 and pressure sidewall cooling channel 322 is sized to meter and increase a velocity of coolant stream 364 and 366 through trailing edge 222 and thus a Reynolds number to facilitate heat transfer and component cooling. Both coolant stream portions 364 and 366 then are channeled through aft cooling channel 318 to facilitate cooling pressure sidewall 210 and suction sidewall 212 along first distance 324. Coolant fluid 236 is then exhausted out a plurality of trailing edge cooling holes 368 that are defined within trailing edge tip section 300 and spaced along airfoil length 218.

Pressure sidewall thickness 304 is substantially similar through trailing edge 222 including along both first and third distances 324 and 348, and suction sidewall thickness 310 is substantially similar through trailing edge 222 including along both first and second distances 324 and 334, respectively. By maintaining a consistent sidewall thickness 304 and 310 throughout trailing edge 222, heat transfer and component cooling are further facilitated because thinner sidewalls 210 and 212 have less thermal resistance.

Suction sidewall cooling channel 320 and pin bank 338 are sized to maintain a substantially constant flow area 349 for coolant stream 366 therethrough. Additionally, pressure sidewall cooling channel 322 and pin banks 350 are sized to maintain a substantially constant flow area 361 for coolant stream 364 therethrough. In the exemplary embodiment, insert 362 is not connected to and is separate from divider 336, thus both pressure sidewall cooling channel 322 and suction sidewall cooling channel 320 have similar inlet pressures 372 and 374 for coolant streams 364 and 366. As such, suction sidewall support projections 340 are sized substantially equal to pressure sidewall support projection 352, and suction sidewall flow area 349 is substantially equal to pressure sidewall flow area 361 to facilitate similar velocity and metering, and thus uniform heat transfer for coolant streams 364 and 366. Additionally, both pressure sidewall cooling channel 322 and suction sidewall cooling channel 320 have a similar sink pressure requirement 376, which is also the source pressure requirement for aft cooling channel 318. As such, the combined exit flow area of pressure sidewall cooling channel 322 and suction sidewall cooling channel 320 is approximately equal to, or slightly greater than, aft cooling channel 318 inlet flow area 333.

In alternative embodiments, insert 362 is coupled 370 to divider 336 such that pressure sidewall cooling channel 322 and suction sidewall cooling channel 320 have separate and different source pressure requirements 372 and 374. For example, coolant fluid 236 that is used for impingement cooling on pressure sidewall 210 is channeled 364 directly to pressure sidewall cooling channel 322 has a first pressure 372, while coolant fluid 236 that is used for impingement cooling on suction sidewall 212 is channeled 366 directly to suction sidewall cooling channel 320 has a second pressure 374. As such, suction sidewall support projections 340 are not sized equal to pressure sidewall support projection 352, such that suction sidewall flow area 349 is not equal to pressure sidewall flow area 361, to facilitate maintaining similar velocity and metering, and thus uniform heat transfer for coolant streams 364 and 366. However, both pressure sidewall cooling channel 322 and suction sidewall cooling channel 320 have a similar sink pressure requirement 376, which is also the source pressure requirement for aft cooling channel 318. As such, the combined exit flow area of pressure sidewall cooling channel 322 and suction sidewall cooling channel 320 is approximately equal to, or slightly greater than, aft cooling channel 318 inlet flow area.

In the exemplary embodiment, suction sidewall cooling channel 320 and pressure sidewall cooling channel 322 are shown as having similar support projections 340 and 352. As such, suction sidewall cooling channel 320 and pressure sidewall cooling channel 322 include similar cross-sectional flow areas 349 and 361. Flow areas 349 and 361, defined by pin banks 338 and 350 as well as divider 336, facilitate increasing a velocity of coolant fluid stream 364 and 366 channeled therethrough, increasing the Reynolds number of streams 364 and 366, and increasing heat transfer from trailing edge 222. The sizing and spacing of support projections 340 and 352 in part define flow areas 349 and 361, and thus support projections 340 and 352 are sized and spaced to facilitate heat transfer and maintain a consistent temperature gradient within trailing edge 222. Additionally, divider 336 facilitates defining flow areas 349 and 361 without having to increase sidewall thicknesses 304 and 310. In alternative embodiments, pressure sidewall cooling channel 322 and suction sidewall cooling channel 320 may be different from one another to facilitate cooling the respective sidewalls 210 or 212 at different thermal temperatures. For example, pressure sidewall support projections 352 may be sized larger than suction sidewall support projections 340.

In the exemplary embodiment, trailing edge cooling system 316 is shown with three cooling channels, aft cooling channel 318, suction sidewall cooling channel 320, and pressure sidewall cooling channel 322, however, in alternative embodiments, trailing edge cooling system 316 includes only two cooling channels, suction sidewall cooling channel 320 and pressure sidewall cooling channel 322, such that coolant fluid 236 is channeled directly to trailing edge cooling holes 368 from each cooling channel.

Figure 4:
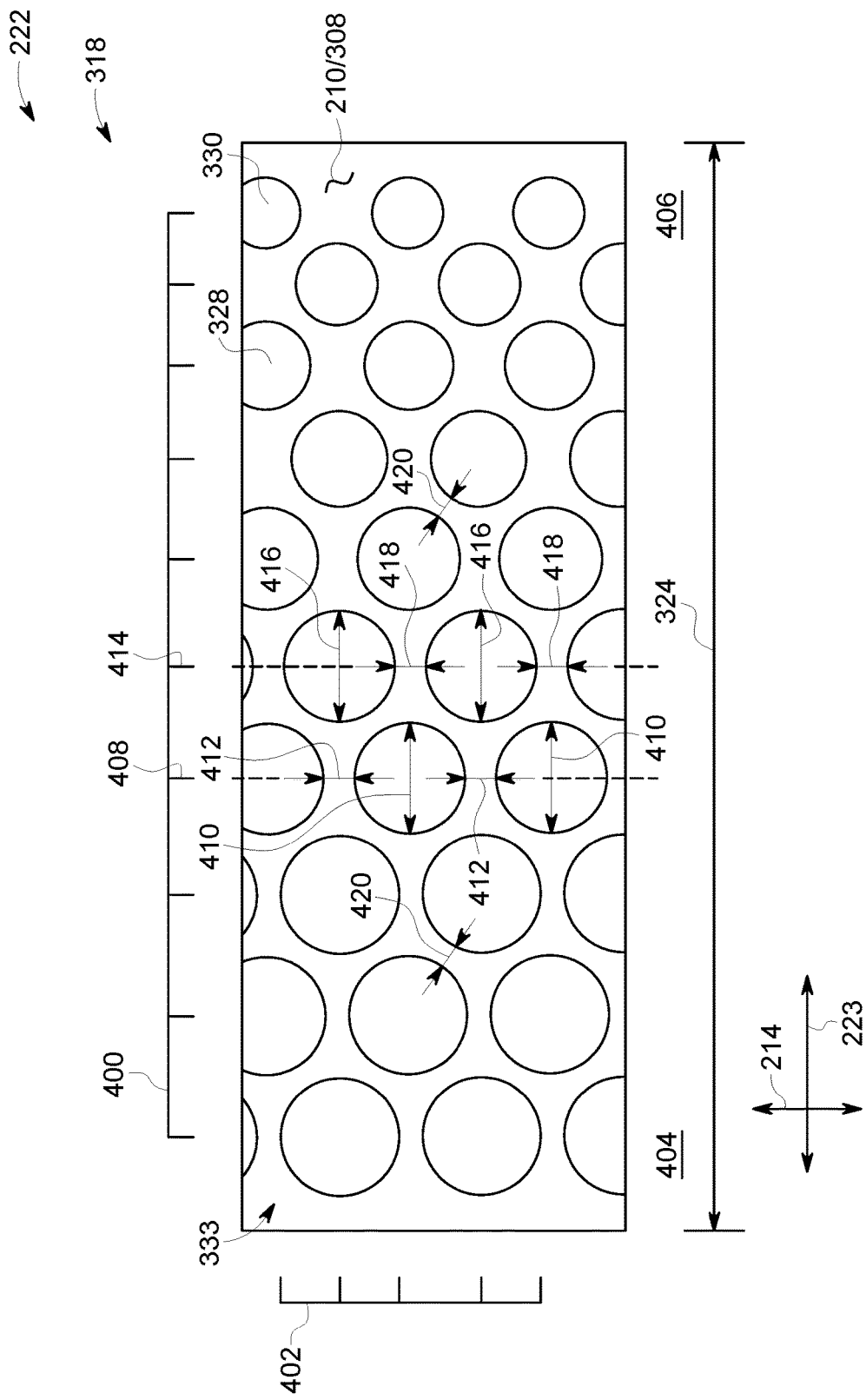
FIG. 4 is another cross-sectional view of the trailing edge shown in FIG. 3 taken along line 4-4.

FIG. 4 is another cross-sectional view of trailing edge 222 taken along line 4-4 as shown in FIG. 3. Specifically, FIG. 4 is a cross-section view of aft cooling channel 318 including aft pin bank 328 extending along first distance 324 in longitudinal direction 223. In the exemplary embodiment, support projections 330 are arranged in a plurality of columns 400 spaced along first distance 324, such that each column 400 includes a plurality of rows 402, spaced along radial length 218 (shown in FIG. 2). Generally, support projections 330 of each row 402 are offset radially from the support projections 330 of adjacent rows 402 to intercept different layers of coolant fluid 236 (shown in FIGS. 2 and 3) flowing therethrough. Additionally, support projections 330 may provide mechanical stability to the trailing edge 222.

In the exemplary embodiment, pressure sidewall 210 and suction sidewall 212 (shown in FIG. 3) taper towards each other and thus are not parallel to one another. As such, aft cooling channel 318 has an upstream space 404 that is wider between pressure sidewall 210 and suction sidewall 212 than a downstream space 406. To maintain uniform flow area 333 throughout aft cooling channel 318 along first distance 324, support projection 330 sizing and spacing within each column 400 is adjusted. For example, an upstream column 408 of support projections 330 has a first diameter 410 and a first spacing 412 between rows 402, and in a downstream column 414 of support projections 330 has a second diameter 416 and a second spacing 418 between rows 402. Support projections 330 within upstream column 408 have diameter 410 that is greater than diameter 416 of support projections 330 within downstream column 414. Additionally, support projections 330 within upstream column 408 have spacing 412 that is less than spacing 418 of support projections 330 within downstream column 414. As such, within aft pin bank 328 support projections 330 generally decrease in diameter (size) and increase in spacing when moving from upstream space 404 to downstream space 406 to provide a consistent flow area 333 throughout the tapered aft cooling channel 318.

Furthermore, each support projection 330 is spaced at least a predetermined distance 420 from one another. Predetermined distance 420 is set such that during the casting process, as discussed above, the ceramic insert that is used to cast the pin bank, such as pin banks 328, 350, and/or 368 (shown in FIG. 3) maintains its form.

In the exemplary embodiment, divider 336 (shown in FIG. 3) facilitates sizing cooling channels 318, 320 (shown in FIG. 3), and 322 (shown in FIG. 3) such that the metering and velocity of coolant fluid 236 (shown in FIG. 2) is maintained therethrough. Divider 336 allows for support projections 330, 340 (shown in FIG. 3), and 352 (shown in FIG. 4) within each respective cooling channel 318, 320, and 322 to maintain a spacing 420 and for trailing edge 222 to maintain a uniform sidewall thickness 304 and 310. By splitting the three cooling channels 318, 320, and 322 into three zones, each respective pin bank 328, 338 (shown in FIG. 3), and 350 (shown in FIG. 3) is sized and shaped to facilitate heat transfer thereof.

The above-described embodiments provide efficient systems for removing heat and cooling gas turbine components. Specifically, in the exemplary embodiment, the gas turbine component includes an airfoil that includes a cooling system defined within a trailing edge. The trailing edge includes two cooling channels, a pressure sidewall cooling channel, and a suction sidewall cooling channel, separated by a divider and each cooling channel defined by a pin bank. The pressure sidewall cooling channel is defined by a pin bank spanning between a pressure sidewall of the airfoil and the divider, while the suction sidewall cooling channel is defined by a pin bank spanning between a suction sidewall of the airfoil and the divider. The divider and the pin banks within the airfoil facilitate controlling metering and a velocity of a coolant stream that is channeled through the pressure sidewall cooling channel and the suction sidewall cooling channel to remove heat from the trailing edge and maintain a consistent and uniform temperature of the airfoil. By metering the coolant stream velocity, the Reynolds number is increased and pressure drop across the cooling channel is increased, thus facilitating an increase of a heat removal rate from the trailing edge.

Further, in some of the above-described embodiments, the cooling system at the trailing edge also includes a third downstream cooling channel, an aft cooling channel, which receives the coolant stream from the pressure sidewall cooling channel and the suctions sidewall cooling channel. The aft cooling channel is defined by a pin bank spanning between the pressure sidewall and the suction sidewall that taper towards one another. This pin bank includes a plurality of support projections that progressively decrease in size and increase in spacing therebetween from an upstream direction to a downstream direction. The aft cooling channel also facilitates controlling metering and the velocity of the coolant stream that is channeled therethrough. As such, the embodiments described herein provide a trailing edge cooling system that decreases bleed air extracted from a compressor for the coolant stream channeled through the cooling system, while increasing the coolant stream efficiency within a component region that is traditionally difficult to cool. Gas turbine engine efficiency is also increased because less bleed air is extracted for use as the coolant stream and combustion temperatures are increased.

An exemplary technical effect of the systems and methods described herein includes at least one of: (a) removing heat from a gas turbine engine component that includes an airfoil; (b) controlling metering and a velocity of a coolant stream within trailing edge cooling channels through a divider and pin bank sizing; (c) increasing coolant stream velocity and Reynolds number through the trailing edge cooling channels; (d) maintaining a consistent temperature gradient with the airfoil to improve component efficiency; (e) decreasing coolant stream amount channeled through the trailing edge cooling channels; (f) reducing coolant fluids extracted from a compressor; and (g) increasing gas turbine engine efficiency.

Exemplary embodiments of systems and methods for removing heat from a gas turbine engine component are described above in detail. The methods and systems are not limited to the specific embodiments described herein, but rather, components of systems and/or steps of the methods may be utilized independently and separately from other components and/or steps described herein. For example, the method may also be used in combination with other turbine components, and are not limited to practice only with the gas turbine engine stator vanes as described herein. Rather, the exemplary embodiment can be implemented and utilized in connection with many other gas turbine engine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbomachine comprising:
  a pressure sidewall;
  a suction sidewall coupled to said pressure sidewall, wherein said suction sidewall and said pressure sidewall define a leading edge and a trailing edge opposite said leading edge;
  a first plurality of projections coupled to said suction sidewall adjacent said trailing edge and extending from said suction sidewall towards said pressure sidewall;
  a second plurality of projections coupled to said pressure sidewall adjacent said trailing edge and extending from said pressure sidewall towards said suction sidewall; and
  a divider coupled to said first plurality of projections and said second plurality of projections and extending within a space defined between said first plurality of projections and said second plurality of projections such that a first cooling channel is defined adjacent said suction sidewall and a second cooling channel is defined adjacent said pressure sidewall, said first cooling channel configured to receive a first coolant stream having a first pressure and said second cooling channel configured to receive a second coolant stream having a second pressure, said first plurality of projections configured to meter the first coolant stream through said first cooling channel and said second plurality of projections configured to meter the second coolant stream through said second cooling channel, wherein each projection of said first plurality of projections are sized to define a first dimensional profile to the first coolant stream impacting thereon and each projection of said second plurality of projections are sized to define a second dimensional profile to the second coolant stream impacting thereon, wherein said first dimensional profile is different from said second dimensional profile to facilitate at least one of cooling said pressure sidewall and said suction sidewall at different temperatures and maintaining substantially uniform heat transfer from the first coolant stream and the second coolant stream when the first pressure is not equal to the second pressure.

2. The airfoil in accordance with claim 1, wherein said leading edge and said trailing edge define a longitudinal direction and a root portion of said airfoil and a tip portion of said airfoil define a radial direction, said suction sidewall and said divider are substantially parallel to each other along a longitudinal length defined in the longitudinal direction, said first plurality of projections define a plurality of columns extending along the longitudinal length and a plurality of rows extending along a radial length defined in the radial direction, each projection of said first plurality of projections sized approximately equal to each other and equidistantly spaced.

3. The airfoil in accordance with claim 1, wherein said leading edge and said trailing edge define a longitudinal direction and a root portion of said airfoil and a tip portion of said airfoil define a radial direction, said pressure sidewall and said divider are substantially parallel to each other along a longitudinal length defined in the longitudinal direction, said second plurality of projections define a plurality of columns extending along the longitudinal length and a plurality of rows extending along a radial length defined in the radial direction, each projection of said second plurality of projections sized approximately equal to each other and equidistantly spaced.

4. The airfoil in accordance with claim 1 further comprising a third plurality of projections coupled to and extending between said suction sidewall and said pressure sidewall such that a third cooling channel is defined adjacent said suction sidewall and said pressure sidewall.

5. The airfoil in accordance with claim 4, wherein said leading edge and said trailing edge define a longitudinal direction and a root portion of said airfoil and a tip portion of said airfoil define a radial direction, said suction sidewall and said pressure sidewall are tapered along a longitudinal length defined in the longitudinal direction, wherein said third plurality of projections define a plurality of columns extending along the longitudinal length and a plurality of rows extending along a radial length defined in the radial direction, each projection of said third plurality of projections equidistantly spaced from an adjacent projection of said third plurality of projections within each column of said plurality of columns, each projection of said third plurality of projections progressively decreasing in size within a respective row, and the equidistant spacing of said each column of said plurality of columns progressively increasing along the longitudinal length.

6. The airfoil in accordance with claim 4, wherein each projection of said first, said second, and said third pluralities of projections are spaced a predetermined distance from each other.

7. The airfoil in accordance with claim 1, wherein said divider is coupled to said first plurality of projections and said second plurality of projections through brazing.

8. The airfoil in accordance with claim 1, wherein a thickness of said suction sidewall adjacent said trailing edge is substantially uniform, and a thickness of said pressure sidewall adjacent said trailing edge is substantially uniform.

9. The airfoil in accordance with claim 1, wherein said divider defines a width extending between said first plurality of projections and said second plurality of projections, and wherein the width of said divider decreases as said divider extends towards said trailing edge.

10. A system for removing heat from an airfoil, the airfoil including a pressure sidewall, a suction sidewall coupled to the pressure sidewall, wherein the suction sidewall and the pressure sidewall define a leading edge and a trailing edge opposite the leading edge, said system comprising:
   a first plurality of projections coupled to the suction sidewall adjacent the trailing edge and extending from the suction sidewall towards the pressure sidewall;
   a second plurality of projections coupled to the pressure sidewall adjacent the trailing edge and extending from the pressure sidewall towards the suction sidewall; and
   a divider coupled to said first plurality of projections and said second plurality of projections and extending within a space defined between said first plurality of projections and said second plurality of projections such that a first cooling channel is defined adjacent the suction sidewall and a second cooling channel is defined adjacent the pressure sidewall, said first cooling channel configured to receive a first coolant stream having a first pressure and said second cooling channel configured to receive a second coolant stream having a second pressure said first plurality of projections configured to meter the first coolant stream through said first cooling channel and said second plurality of projections configured to meter the second coolant stream through said second cooling channel, wherein each projection of said first plurality of projections are sized to define a first dimensional profile to the first coolant stream impacting thereon and each projection of said second plurality of projections are sized to define a second dimensional profile to the second coolant stream impacting thereon, wherein said first dimensional profile is different from said second dimensional profile to facilitate at least one of cooling the pressure sidewall and the suction sidewall at different temperatures and maintaining substantially uniform heat transfer from the first coolant stream and the second coolant stream when the first pressure is not equal to the second pressure.

11. The system in accordance with claim 10, wherein said first plurality of projections configured to maintain a substantially constant flow area for the first coolant stream through said first cooling channel.

12. The system in accordance with claim 10, wherein said second plurality of projections configured to maintain a substantially constant flow area for the second coolant stream through said second cooling channel.

13. The system in accordance with claim 10 further comprising a third plurality of projections coupled to and extending between the suction sidewall and the pressure sidewall such that a third cooling channel is defined adjacent the suction sidewall and the pressure sidewall.

14. The system in accordance with claim 13, wherein said first cooling channel and said second cooling channel are disposed upstream of said third cooling channel, said third cooling channel configured to receive a mixture of the first coolant stream and the second coolant stream.

15. The system in accordance with claim 14, wherein said third plurality of projections is configured to maintain a substantially constant flow area for the mixture of the first coolant stream and the second coolant stream through said third cooling channel.

16. A turbomachine comprising:
   a compressor,
   a turbine rotatably coupled to said compressor,
   a combustor coupled in flow communication with said compressor and said turbine; and
   at least one airfoil coupled to said turbine, said at least one airfoil comprising:
      a pressure sidewall;
      a suction sidewall coupled to said pressure sidewall, wherein said suction sidewall and said pressure sidewall define a leading edge and a trailing edge opposite said leading edge;
      a first plurality of projections coupled to said suction sidewall adjacent said trailing edge and extending from said suction sidewall towards said pressure sidewall;
      a second plurality of projections coupled to said pressure sidewall adjacent said trailing edge and extending from said pressure sidewall towards said suction sidewall; and
      a divider coupled to said first plurality of projections and said second plurality of projections and extending within a space defined between said first plurality of projections and said second plurality of projections such that a first cooling channel is defined adjacent said suction sidewall and a second cooling channel is defined adjacent said pressure sidewall, said first cooling channel configured to receive a first coolant stream having a first pressure and said second cooling channel configured to receive a second coolant stream having a second pressure, said first plurality of projections configured to meter the first coolant stream through said first cooling channel and said second plurality of projections configured to meter the second coolant stream through said second cooling channel, wherein each projection of said first plurality of projections are sized to define a first dimensional profile to the first coolant stream impacting thereon and each projection of said second plurality of projections are sized to define a second dimensional profile to the second coolant stream impacting thereon, wherein said first dimensional profile is different from said second dimensional profile to facilitate at least one of cooling said pressure sidewall and said suction sidewall at different temperatures and maintaining substantially uniform heat transfer from the first coolant stream and the second coolant stream when the first pressure is not equal to the second pressure.

17. The turbomachine in accordance with claim 16 further comprising a third plurality of projections coupled to and extending between said suction sidewall and said pressure sidewall such that a third cooling channel is defined adjacent said suction sidewall and said pressure sidewall.

18. The turbomachine in accordance with claim 17, wherein said leading edge and said trailing edge define a longitudinal direction and a root portion of said airfoil and a tip portion of said airfoil define a radial direction, said suction sidewall and said pressure sidewall are tapered along a longitudinal length defined in the longitudinal direction, wherein said third plurality of projections define a plurality of columns extending along the longitudinal length and a plurality of rows extending along a radial length defined in the radial direction, each projection of said third plurality of projections equidistantly spaced from an adjacent projection of said third plurality of projections within each column of said plurality of columns, each projection of said third plurality of projections progressively decreasing in size within a respective row, and the equidistant spacing of said each column of said plurality of columns progressively increasing along the longitudinal length.

19. The turbomachine in accordance with claim 17, wherein each projection of said first, said second, and said third pluralities of projections are spaced a predetermined distance from each other.

* * * * *